United States Patent
Reinking et al.

(10) Patent No.: US 7,935,651 B1
(45) Date of Patent: May 3, 2011

(54) METHOD FOR PREPARING A ZIEGLER-NATTA CATALYST

(75) Inventors: Mark K. Reinking, Mason, OH (US); Joachim T. M. Pater, Cocomaro di Focomorto (IT); Giampiero Morini, Padua (IT)

(73) Assignee: Equistar Chemicals, L.P., Houston, TX (US)

( * ) Notice: Subject to any disclaimer, the term of this patent is extended or adjusted under 35 U.S.C. 154(b) by 0 days.

(21) Appl. No.: 12/658,191

(22) Filed: Feb. 4, 2010

(51) Int. Cl.
*B01J 31/00* (2006.01)
*B01J 21/00* (2006.01)
*C08F 4/44* (2006.01)

(52) U.S. Cl. ........ 502/116; 502/110; 502/133; 502/158; 502/232; 526/124.4; 526/124.5; 526/124.6; 526/124.8; 526/124.9; 526/128

(58) Field of Classification Search .......... 502/110, 502/116, 133, 158, 232; 526/124.4, 124.5, 526/124.6, 124.8, 124.9, 128, 129, 130
See application file for complete search history.

(56) References Cited

U.S. PATENT DOCUMENTS

| 4,464,518 | A | * | 8/1984 | Iwabuchi et al. | ............ 526/127 |
| 4,511,669 | A | * | 4/1985 | Gessell | ............ 502/110 |
| 4,518,706 | A | | 5/1985 | Gessel | |
| 2009/0306316 | A1 | | 12/2009 | Morini et al. | |

FOREIGN PATENT DOCUMENTS

| WO | WO-95/06672 | 3/1995 |
| WO | WO 95/06672 A1 * | 3/1995 |

* cited by examiner

*Primary Examiner* — David Wu
*Assistant Examiner* — Elizabeth Eng

(57) ABSTRACT

A method for preparing a titanium-containing Ziegler-Natta catalyst is disclosed. A dialkyl magnesium compound, a trialkyl aluminum compound, and a polymethylhydrosiloxane are first combined in a hydrocarbon solvent. That product is then combined with dry, alcohol-free magnesium chloride. A solid product from the reaction with the magnesium chloride component is isolated and washed with a hydrocarbon solvent. The washed solid product is then combined with an alkyl aluminum dichloride or a dialkyl aluminum chloride to give the catalyst. The catalyst is suitable for both slurry and gas-phase olefin polymerizations. Polyolefins produced with the catalyst have broad molecular weight distributions and narrow distributions of relatively large particles.

10 Claims, No Drawings

METHOD FOR PREPARING A ZIEGLER-NATTA CATALYST

FIELD OF THE INVENTION

The invention relates to a method for preparing a Ziegler-Natta catalyst that is particularly useful for slurry and gas-phase olefin polymerizations. Polyolefins prepared with the catalyst have broad molecular weight distributions.

BACKGROUND OF THE INVENTION

Interest in catalysis continues to grow in the polyolefin industry. Many olefin polymerization catalysts are known, including conventional Ziegler-Natta catalysts. Known processes to polymerize olefins include solution, slurry, and gas-phase processes. As end-use applications become more demanding, there is an increased incentive to improve polyolefin properties by catalyst technology and process improvements.

One type of Ziegler-Natta catalyst that has high efficiency uses a magnesium-containing polysiloxane support (see U.S. Pat. Nos. 4,511,669 and 4,518,706 and WO 95/06672). The catalyst can be prepared by reacting a hydropolysiloxane with a dialkyl magnesium compound and contacting the reaction product with a transition metal alkoxide. This mixture is then reacted with a halogenating agent, such as a dialkyl aluminum chloride or an alkyl aluminum dichloride. Altering the halogen to magnesium ratio influences the molecular weight distribution of the polymer.

The Ziegler-Natta catalysts described above are effective for solution polymerizations. For slurry processes, however, a balance must be struck between polyolefin particle size and catalyst efficiency. As efficiency increases, polyolefin bulk density decreases. Thus, the catalysts cannot be used in some slurry processes because fine particles of polyolefin are produced. Also, the catalysts are generally not useful in gas-phase polymerizations.

In sum, better Ziegler-Natta catalysts, particularly ones that utilize polyhydrosiloxane supports, are needed. A valuable catalyst would be suitable for gas and slurry-phase processes and could be used to produce polyolefins with broad molecular weight distribution without generating fine particles.

SUMMARY OF THE INVENTION

The invention relates to a method for preparing a titanium-containing Ziegler-Natta catalyst. A dialkyl magnesium compound, a trialkyl aluminum compound, a polymethylhydrosiloxane, and optionally a titanium alkoxide are first combined in a hydrocarbon solvent. That product is then combined with dry, alcohol-free magnesium chloride, which may include titanium tetrachloride. A solid product from the reaction with the magnesium chloride component is isolated and washed with a hydrocarbon solvent. The washed solid product is then combined with an alkyl aluminum dichloride or a dialkyl aluminum chloride to give the solid catalyst. The catalyst is suitable for both slurry and gas-phase olefin polymerization processes. The invention includes a process for polymerizing an olefin in the presence of the catalyst. Polyolefins produced with the catalyst have broad molecular weight distributions and narrow distributions of relatively large particles.

DETAILED DESCRIPTION OF THE INVENTION

The invention relates to a four-step method for preparing a titanium-containing Ziegler-Natta catalyst. The titanium is introduced into the catalyst as a titanium alkoxide in step (a), during preparation of the magnesium chloride used in step (b), or both.

Step (a)

In a first step, a dialkyl magnesium compound, a trialkyl aluminum compound, and a polymethylhydrosiloxane are combined in a first hydrocarbon solvent. A titanium alkoxide is optionally included.

Preferred dialkyl magnesium compounds have the formula $R_2Mg$, where R is a $C_1$-$C_{20}$ alkyl group. More preferably, R is $C_1$-$C_6$ alkyl. Examples include diethylmagnesium, dimethylmagnesium, diisopropylmagnesium, butylethylmagnesium, and the like, and mixtures thereof.

Preferred trialkyl aluminum compounds have the formula $R'_3Al$, where R' is a $C_1$-$C_{20}$ alkyl group. More preferably, R' is $C_1$-$C_{10}$ alkyl. Examples include triethylaluminum, triisobutylaluminum, trioctylaluminum, and the like, and mixtures thereof.

Polymethylhydrosiloxanes contain at least some units of the structure:

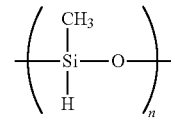

where n is greater than 3. Preferably, the polymethylhydrosiloxane is terminated with trimethylsilyl groups and has the structure:

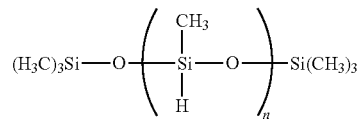

By "polymethylhydrosiloxane," we also include random and block copolymers containing the methylhydrosiloxane unit. For example, we include dimethylsiloxane copolymers and methyloctylsiloxane copolymers exemplified with the following structures, where m and n>3:

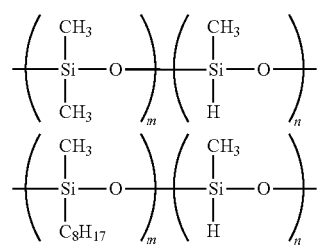

Preferably, the polymethylhydrosiloxane is a homopolymer. Preferably, the polymethylhydrosiloxane has a number average molecular weight (Mn) within the range of 700 and 20,000 g/mol, more preferably from 1500 to 10,000 g/mol. The dialkyl magnesium compound, trialkyl aluminum compound, and polymethylhydrosiloxane are combined in a first hydrocarbon solvent. Preferred hydrocarbon solvents are $C_6$-$C_{20}$ aliphatic, cycloaliphatic, or aromatic hydrocarbons. Examples include heptane, cyclohexane, methylcyclopentane, and toluene. Preferably, the hydrocarbon solvent is aliphatic or cycloaliphatic. Mixtures of hydrocarbons can be used. It is convenient, but not necessary, to use a single hydrocarbon solvent for step (a) and subsequent washing steps.

A titanium alkoxide is optionally included in the first step and is needed in the event that the dry, alcohol-free magnesium chloride used in the second step lacks titanium. Preferred titanium alkoxides have the formula $Ti(OR'')_4$ where R'' is a $C_1$-$C_{20}$ alkyl group. Suitable titanium alkoxides include titanium(IV) propoxide, titanium(IV) isopropoxide, titanium(IV) 2-ethylhexoxide, and the like, and mixtures thereof.

The components can be combined in a variety of proportions within the skilled person's discretion. Preferably, amounts are used such that the silicon to magnesium molar ratio in the catalyst is greater than 2:1. The aluminum to magnesium molar ratio is preferably between 0.5:1 and 50:1, more preferably between 2:1 and 20:1. The magnesium to titanium molar ratio is preferably between 4:1 and 200:1, more preferably between 10:1 and 100:1. (The latter ratios apply whether the titanium derives from a titanium alkoxide or otherwise.)

The dialkyl magnesium compound, trialkyl aluminum compound, polymethylhydrosiloxane, and any titanium alkoxide can be combined in any order. Preferably, the diakyl magnesium compound and trialkyl aluminum compound are combined in a hydrocarbon solvent, stirred, and the polymethylhydrosiloxane is added, followed by the optional titanium alkoxide. After the additions, the mixture is preferably stirred for at least 20 minutes.

Step (b)

In a second step, the product from step (a) is combined with dry, alcohol-free magnesium chloride. By "dry" and "alcohol-free," we mean that substantially all of the water and alcohol normally present initially has been removed and that there is an average of less than one water or alcohol molecule per magnesium atom, preferably an average of less than 0.3 water or alcohol molecule per magnesium atom.

Typically, magnesium chloride exists with several molecules of water, as in the hexahydrate complex. One common way to prepare magnesium chloride is to crystallize it from an alcoholic solution. Ethanol is often used as the solvent. When this is done, the magnesium chloride particles often have several equivalents of alcohol, and the hexaalcoholate is common. Water and alcohol can be removed by heat treatment. Another convenient method is by chemical treatment with a substance, such as a metal halide, that readily reacts with water or alcohol. Dry, alcohol-free magnesium chloride can be prepared, e.g., by treatment with silicon tetrachloride or titanium tetrachloride. One convenient method of preparing dry, alcohol-free magnesium chloride by treatment with titanium tetrachloride is described in U.S. Pat. Appl. Publ. No. 2009/0306316, the teachings of which are incorporated herein by reference. In a preferred method of this type, a spherical support comprising an adduct of magnesium chloride and ethanol, preferably containing about 25 wt. % ethanol, is combined with titanium tetrachloride and aluminum chloride with heating under conditions effective to provide the dry, alcohol-free magnesium chloride. When titanium tetrachloride is used to prepare the dry alcohol-free magnesium chloride, the titanium alkoxide can be omitted from step (a), although titanium can be introduced in both step (a) and (b) if desired.

Step (c)

In a third step, a solid product resulting from step (b) is isolated by any suitable method, including filtration, decanting, or the like. The solid product is then washed with a second hydrocarbon solvent, which can be the same as or different from the first hydrocarbon solvent. Suitable hydrocarbon solvents have already been described. The choice of solvent will depend on many factors and is left to the skilled person's discretion.

Step (d)

In a fourth step, the washed solid from step (c) is combined with an aluminum compound. The aluminum compound is selected from the group consisting of alkyl aluminum dichlorides and dialkyl aluminum chlorides. Preferably, the alkyl groups are $C_1$ to $C_6$ alkyl groups. More preferably, the aluminum compound is ethylaluminum dichloride or diethylaluminum chloride.

Preferably, the aluminum compound is dissolved in a hydrocarbon solvent and added to the washed solid product from step (c) with stirring. The solution can be added directly to the dry solid or to a slurry of the solid in a hydrocarbon. The stirring should be enough to give good mixing, but extensive stirring can break the particles and is undesirable. A contact time of 1 hour with intermittent stirring gives good results.

After combining the washed solid product from step (c) with the aluminum compound, the liquid is preferably removed by filtration, decanting, or the like, and the solid is then preferably washed with a third hydrocarbon solvent. After washing, the solid catalyst can be used "as is" or it can be dried under vacuum. Alternatively, the washed catalyst can be slurried in a hydrocarbon solvent and added to a polymerization reactor as a slurry. Preferably, the washed catalyst is dried under vacuum and is added to a polymerization reactor as a powder.

The invention includes a catalyst made by the method of the invention. Preferably, the catalyst has a particle size and particle size distribution that make it suitable for a slurry or gas-phase polymerization process. Ideally, the catalyst has a small proportion of fine particles. A measure of this is the particle size diameter at the $10^{th}$ percentile based on volume, D (v, 0.1). Preferably, the D (v, 0.1) is greater than 5 microns, more preferably, greater than 10 microns. Preferably, the particle size distribution of the catalyst is narrow. The span is a measure of the breadth of the particle size distribution. Measurements are made at the $10^{th}$, $50^{th}$, and $90^{th}$ percentiles and the span is calculated from the formula: span=(D (v, 0.9)−D (v, 0.1))/D (v, 0.5). The lower the number, the more narrow the particle size distribution. Preferably, the span is less than 3.0, more preferably, less than 2.0. Most preferably, the catalyst has a D (v, 0.1) greater than 10 microns and a span less than 2.0. Particle size diameter and distribution can be determined using any suitable instrument, such as, e.g., a Malvern Mastersizer 2000 particle size analyzer.

One reason that the particle size and size distribution of the catalyst is important is because it influences the particle size and distribution of the polyolefin made from the catalyst. Generally, a catalyst with a higher D (v, 0.1) and a lower span is suitable for slurry or gas-phase processes. If the polyolefin has fine particles, there can be many process problems, such as build-up of static charge, problems with filtration, and polyolefin fines plugging solvent distillations. These process problems can render a catalyst unsuitable for use in gas-phase or certain slurry processes.

The invention includes processes that use the catalyst. The catalyst is particularly well-suited for slurry and gas-phase olefin polymerization. It can also be used for combination processes, e.g., processes that have one or more slurry reactors and one or more gas-phase reactors. There are several variations of each of these processes. Generally, in a slurry process, a hydrocarbon is used as a slurry medium in which the polyolefin product is substantially insoluble. There are many known reactor designs. In a slurry-loop process, the reactor is a tubular loop located within a larger tube through which water flows to heat or cool the reactor as desired. One or more circulating pumps drive the reactor contents around the loop at relatively high velocity to promote good heat transfer and minimize reactor fouling. The loops may be oriented horizontally or vertically. Vertical loop reactors have shown advantages in minimizing fouling as compared to horizontal loop reactors. Methods for operating gas-phase polymerization processes are well known in the art. Such methods generally involve agitating a bed of catalyst, or a bed of the target polyolefin containing a catalyst, and feeding a stream of monomer at least partially in the gaseous phase, under conditions such that at least part of the monomer polymerizes in contact with the catalyst in the bed. For both the slurry and gas-phase processes, the catalyst can be critical, especially its particle size and morphology. Some Ziegler-Natta catalysts generate a large proportion of fine polyolefin particles, which can upset the process. Each process has its own requirements. The inventive catalyst is suitable for both gas-phase and slurry processes.

Preferably, the olefin polymerized is an α-olefin, more preferably, the olefin is selected from ethylene, propylene, 1-butene, 1-hexene, 1-octene, and mixtures thereof. Preferably, the polymerization is performed at a temperature within the range of 30° C. to 100° C., more preferably from 40° C. to 90° C.

The following examples merely illustrate the invention. Those skilled in the art will recognize many variations that are within the spirit of the invention and scope of the claims.

Particle Size Analysis

Catalyst particle sizes are measured using a Malvern Mastersizer 2000 S long bed particle size analyzer with a 300-mm lens and using a 14.3-mm beam length. The instrument is fitted with a stirred wet cell. A heptane solution containing an emulsifier is used to disperse the catalyst particles. The catalyst dispersion is fed into the cell through a septum to obtain an acceptable obscuration value.

Polymer particle sizes are measured using the same instrument equipped with a 1000-mm lens and using a 10-mm beam length. The instrument is fitted with a dry powder feed unit. Feed rate: 3.0 g/min. Jet pressure: 1.6 bar. Sieve opening: 2000 um. The feed rate is adjusted to obtain an acceptable obscuration value.

Example 1

Magnesium Chloride-Supported Catalyst

In a dry box, butylethylmagnesium (1.33 mL of 1.25 M solution in heptane, containing 0.029 M triethylaluminum; available from AkzoNobel as MAGALA BEM) is added to a bottle. Heptane (0.5 mL) and triethylaluminum (0.12 mL of 1.54 M solution in heptane) is added with stirring. The mixture is stirred for about 1 minute and trimethylsilyl-terminated polymethylhydrosiloxane homopolymer (0.30 mL; Mn=3400 g/mol, available from Rhodia) is slowly added. The mixture is stirred for about 1 minute and titanium isopropoxide (0.05 mL; 97%, available from Aldrich Chemical Company) is slowly added causing the solution to turn to a clear, dark brown. The solution is stirred for 1 hour and added to a slurry of heptane (10 mL) and titanium tetrachloride supported on magnesium chloride (1.248 g, prepared by reacting a magnesium chloride-ethanol adduct in liquid titanium tetrachloride as described in Example 7 of U.S. Pat. Appl. Publ. No. 2009/0306316; particle size: D (v, 0.1)=20.0 microns; span=1.5).

The mixture is stirred intermittently. After 1 hour, the liquids are decanted and the solids are washed heptane (2×15 mL). The washed solids are slurried in heptane (15 mL) and ethylaluminum dichloride (6.25 mL of 1.0 M solution in hexanes, available from Aldrich Chemical Company) is slowly added. The mixture is stirred intermittently. After 1 hour, the liquids are decanted and the solids are washed with heptane (3×15 mL). The solids are dried under vacuum to give a grey-brown solid. D (v, 0.1)=18.5 microns. Span=1.6.

Example 2

Example 1 is repeated with similar results showing good reproducibility of the method. The results are reported in Table 1.

Comparative Example 3

Example 1 is repeated with a different order of addition. The titanium tetrachloride supported on magnesium chloride is added first. The other components are added in the same fashion, except that the ethylaluminum dichloride (0.42 mL of 1.0 M solution in hexanes) is added to seed the formation of solids after addition of the trimethylsilyl-terminated polymethylhydrosiloxane homopolymer. A portion of the final solid is dried for particle size determination, but the solid fuses upon drying. The fused material is analyzed, and the results are reported in Table 1.

Comparative Example 4

Comparative Example 3 is repeated with a different order of addition. The titanium tetrachloride supported on magnesium chloride is added after seeding with the ethylaluminum dichloride. Results are reported in Table 1.

Comparative Example 5

Example 1 is repeated but omits the decanting/heptane wash step that is done prior to adding ethylaluminum dichloride. Results are reported in Table 1.

TABLE 1

| | Catalysts | | |
|---|---|---|---|
| Example | D (v, 0.1) | D (v, 0.5) | Span |
| 1 | 18.5 | 34.7 | 1.6 |
| 2 | 22.7 | 43.5 | 1.3 |
| C3 | 10.5 | 63.9 | 6.8 |
| C4 | 2.7 | 10.9 | 3.1 |
| C5 | 2.1 | 20.3 | 2.6 |

The method of the invention gives a catalyst without appreciable fine particles and with a narrow particle size distribution. The D (v, 0.1) is remarkably higher than in the comparative examples and the span is remarkably lower. Comparative Example 3 represents a common method of supporting a catalyst by starting with the solid support. The results, particularly the span, are much worse. Comparative Example 4 shows that the order of addition is critical. Comparative Example 5 shows the importance of the wash step that precedes addition of the alkyl aluminum dichloride. Thus, it is the particular steps and their sequence that provide the surprising results.

Example 6

Polymerization

Polymerizations are conducted in a one-gallon reactor at 80° C., stirred at 1000 rpm with a downward pumping marine propeller. In a dry box, one leg of a two-leg catalyst injector is loaded with triethylaluminum (0.91 mL of 1.54 M solution in heptane). The solid from Example 1 (27 mg) is loaded into the other leg and the injector is attached to the reactor. The reactor is vented to 0 psi and the vent is closed. Hydrogen is added from a pressurized 300-mL vessel to effect a pressure drop of 200 psi. 1-Butene (20 mL) is added, followed by isobutane (1.0 L). Stirring begins, and the triethylaluminum is added from the injector leg with a flush of isobutane (200 mL). The reactor is allowed to reach the temperature set point of 80° C., and ethylene is added to effect a reactor pressure increase of 80 psi. The catalyst is flushed into the reactor with isobutane (200 mL). Ethylene is continuously fed to maintain reactor pressure. After one hour, the ethylene feed and stirring are stopped, the reactor is vented, and polyethylene is removed, dried, and tested.

Activity: 9,000 g polyethylene per g supported catalyst. Melt index (MI, by ASTM D1238, Condition 190/2.16): 0.1. Polydispersity ($M_w/M_n$) by gel-permeation chromatography: 6.0. Bulk density: 0.34 g/mL. D (v, 0.1): 720 microns. Span: 0.89.

Example 7

The polymerization of Example 6 is repeated with hydrogen to effect a pressure drop of 800 psi and without using 1-butene. Results are reported in Table 2.

Example 8

The polymerization of Example 6 is repeated using a catalyst prepared as in Example 1 but without titanium isopropoxide. Results are reported in Table 2.

Example 9

The polymerization of Example 7 is repeated using a catalyst prepared as in Example 1 but without titanium isopropoxide. Results are reported in Table 2.

Comparative Example 10

The polymerization of Example 6 is repeated using a catalyst prepared without titanium tetrachloride supported on magnesium chloride. The catalyst is described in U.S. Pat. Nos. 4,511,669 and 4,518,706 and in WO 95/06672 and is prepared by adding a portion of the ethylaluminum chloride prior to the titanium isopropoxide as a seed step, followed by adding the remainder of the ethylaluminum dichloride after the titanium isopropoxide. The catalyst is used without drying and the activity is 54 g polyethylene/mL catalyst. Results are reported in Table 2.

Comparative Example 11

The polymerization of Comparative Example 10 is repeated except that the catalyst is dried. Results are reported in Table 2.

TABLE 2

| | Polymerizations | | | | | |
|---|---|---|---|---|---|---|
| Ex. | Activity (g PE/g sup. cat.) | MI | $M_w/M_n$ | D (v, 0.1) | D (v, 0.5) | Span |
| 6 | 9,000 | 0.1 | 6.0 | 720 | 1100 | 0.89 |
| 7 | 8,000 | 2.0 | 7.4 | 750 | 1100 | 0.79 |
| 8 | 8,000 | 0.5 | 6.5 | 690 | 1100 | 0.82 |
| 9 | 8,000 | 1.6 | 7.5 | 790 | 1200 | 0.85 |
| C10 | — | 0.1 | 4.3 | 105 | 400 | 3.0 |
| C11 | 7,000 | 0.4 | 5.2 | 65 | 400 | 3.3 |

The known catalyst, used in Comparative Examples 10 and 11, gives fine polyethylene particles and a broad particle size distribution. This makes the known catalyst problematic for slurry processes and unsuitable for gas-phase processes.

In contrast, the catalyst prepared by the inventive method does not produce fine polyethylene particles. The D (v, 0.1) is greater than 600, compared with 105 or 65 microns for the known catalyst. The polyethylene particle size distribution is also much narrower when the inventive catalyst is used (span <1.0 compared with 3.0 or 3.3). Additionally, Examples 6-10 show that the catalyst provides polyethylene with desirably broad molecular weight distribution ($M_w/M_n > 5$).

The preceding examples are meant only as illustrations. The following claims define the invention.

We claim:

1. A method for preparing a titanium-containing Ziegler-Natta catalyst, said method comprising:
    a) combining a dialkyl magnesium compound, a trialkyl aluminum compound, and a polymethylhydrosiloxane in a first hydrocarbon solvent;
    b) combining the product from step (a) with dry, alcohol-free magnesium chloride;
    c) washing a solid product isolated from step (b) with a second hydrocarbon solvent; and
    d) combining the washed solid product with an aluminum compound selected from the group consisting of alkyl aluminum dichlorides and dialkyl aluminum chlorides to give the catalyst;
   wherein titanium is introduced as a titanium alkoxide in step (a), during preparation of the magnesium chloride used in step (b), or both.

2. The method of claim 1 wherein the magnesium chloride has an average particle size within the range of 5 and 100 microns.

3. The method of claim 1 wherein step (a) includes a titanium alkoxide.

4. The method of claim 1 wherein the magnesium chloride is a titanium-modified material made by reacting a magnesium chloride alcoholate with titanium tetrachloride.

5. The method of claim 1 further comprising washing the catalyst from step (d) with a third hydrocarbon solvent.

6. The method of claim 1 wherein the first and second hydrocarbon solvents are the same.

7. A process which comprises polymerizing an olefin in the presence of a catalyst prepared by the method of claim 1.

8. A gas-phase process of claim 7.

9. A slurry process of claim 7.

10. A catalyst prepared by the method of claim 1.

* * * * *